Patented Dec. 18, 1934

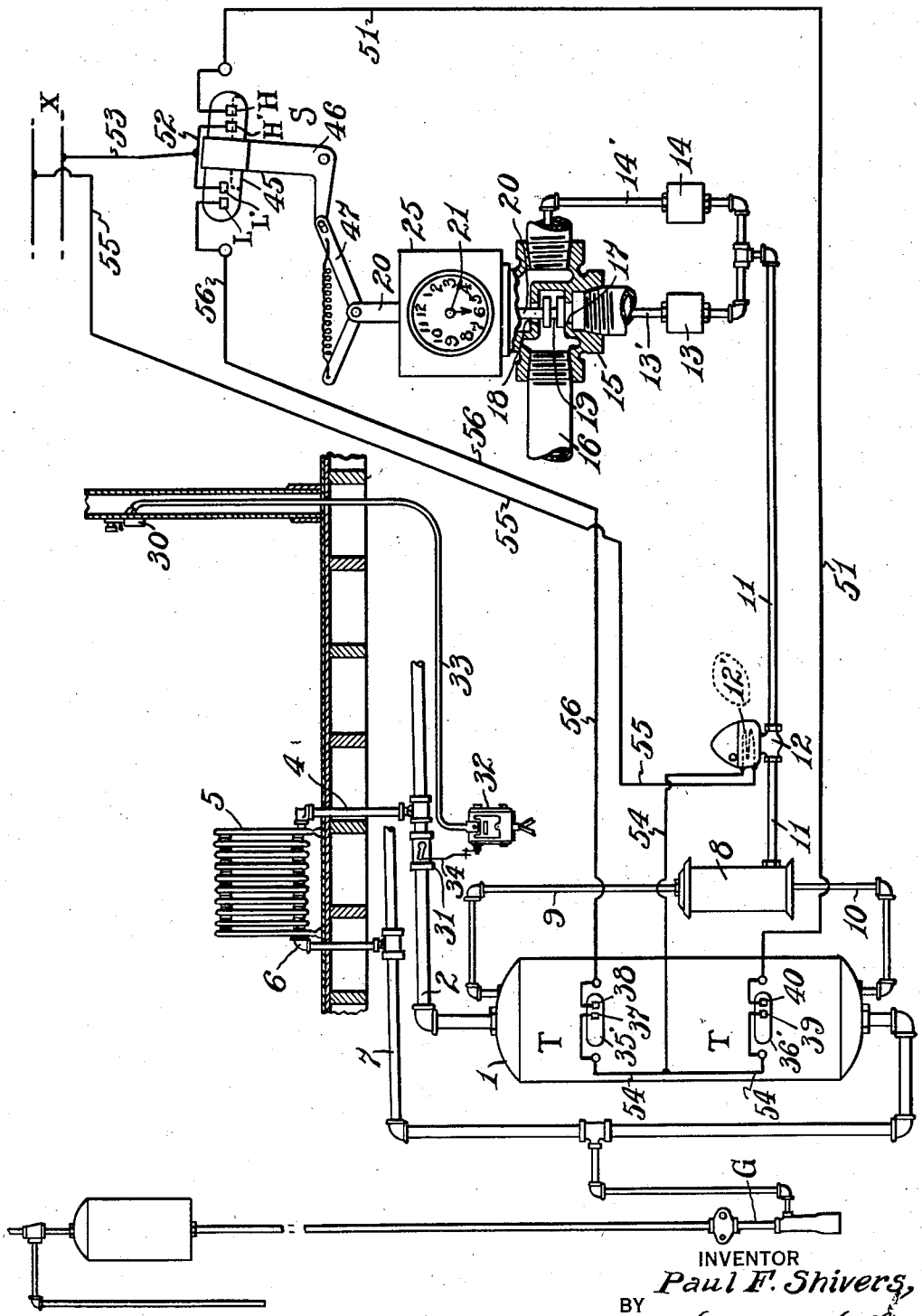

1,985,216

UNITED STATES PATENT OFFICE 1,985,216

METHOD OF HEATING FLUID

Paul F. Shivers, Wabash, Ind., assignor to Minneapolis-Honeywell Regulator Company, Minneapolis, Minn., a corporation of Delaware Application August 17, 1931, Serial No. 557,600

7 Claims. (Cl. 237—12)

Many public utilities supplying gas or electric current for various purposes charge a lower rate for service during certain periods of each twenty-four hours when the normal demand is low in order to stimulate consumption during the off-peak periods.

The object of my present invention is to provide a hot water heating system, particularly designed for house heating by gas or electric current, by means of which room heating may be effected during the major portion of the time by means of water which has been heated during the low cost rate periods.

The accompanying drawing illustrates diagrammatically an embodiment of my invention in a system the water-heating medium of which is to be gaseous fuel.

In the drawing 1 is a suitably heat insulated storage tank of sufficient capacity to contain a body of water sufficient in volume, when highly heated, and controllably circulated through the room-heating radiators, to sufficiently heat the rooms under normal conditions or for a major portion of each twenty-four hours.

Leading from the top of tank 1 is a main delivery pipe 2 delivering to a series of pipes 4, each of which leads to a radiator 5, each radiator having a return pipe 6 delivering to a main return pipe 7 which leads into the bottom of tank 1. A high-efficiency gas heater 8 is connected in the usual manner by pipes 9 and 10 with the interior of tank 1 so as to be capable of heating the contents of tank 1 to the desired temperature. Heater 8, in the illustrated embodiment is supplied with gas through a pipe 11 having a control valve 12 of well-known form therein, said valve being preferably of the electro-magnetic type.

Gas to pipe 11 is supplied by means of suitable piping connections through either a low rate meter 13 or a high rate meter 14. Meters 13 and 14 are supplied through pipes 13' and 14' respectively from a valve casing 15 which is connected to the main gas supply line or power line 16. Casing 15 is provided with a valve seat 17 through which gas may flow to pipe 13' and with a valve seat 18 through which gas may flow to pipe 14'; and arranged between the seats 17 and 18 is a valve 19 which may be seated alternately upon the seats 17 and 18 to control flow therethrough. Valve 19 is carried by a stem 20 controlled by a program clock 21, of well-known construction, the arrangement being such that, during given periods of each twenty-four hours, connection will be established between pipes 16 and 13' and during the remaining portion of each twenty-four hours connection will be established between pipe 16 and pipe 14'.

The time control valve unit just described will be enclosed within a locked casing 25 and accessible only to an authorized representative of the utility company whereby fuel for the heater 8 will be delivered through the low rate meter or the high rate meter, depending upon the authorized adjustments of the time train.

In order to automatically control the flow of hot water to the radiators in accordance with the temperature requirements of the space or spaces to be heated, I provide one or more room thermostats 30, of well-known form, a corresponding number of valves 31 arranged between tank 1 and any desired grouping of radiators 5, and valve-actuating mechanism 32 under the control of each thermostat 30, the arrangement being such that valve 31 will be opened and closed in accordance with the temperature environment of the thermostat 30. The thermostat 30 in the diagram is indicated as of the electric-terminal type connected by cable 33 with the actuator 32 which is of a well-known electric-motor type connected by connections 34 of well-known character with valve 31.

Efficient room heating can be attained with water at say somewhere between 100 to 140 degrees F., but in order to avoid the necessity of too large a storage tank 1 it is desirable to be able to carry the temperature of the water considerably higher when low-priced gas is available. It is also necessary to provide means for automatically starting the heater when the water temperature falls to an inefficient minimum say, 100 degrees F., and to stop the heater when the water temperature has risen to a desired maximum. In order to accomplish the desired results I provide two electric terminal thermostatic elements T and T' of well-known form and known in the trade as aquastats, each comprising a bi-metallic thermostatic element (not shown) and, for instance, a mercury contact tube 35' or 36' respectively. Tube 35' comprises the two terminals 37 and 38 and the tube 36' comprises the two terminals 39 and 40

Arranged adjacent the time-train 21 is a time-switch S comprising a mercury tube 45 having a pair of terminals L, L' and a pair of terminals H, H' at opposite ends of the tube. Tube 45 is carried by pivoted arm 46 connected by a snap-toggle 47 with stem 20 of valve 19, the arrangement being such that when valve 19 is in position to establish gas flow from pipe 16 through the high rate meter 14, terminals H, H' of tube 45 are active, and when valve 19 is in position to establish gas flow through the low rate meter 13, terminals L, L' are active Terminal 40 is connected by wire 51 with terminal H. Terminals L' and H' are connected by wire 52 and this wire is connected by wire 53 with one side of the supply line X. Terminals 37 and 39 are connected together and to one end of the coil 12' of valve 12 by the branched wire 54, and the other end of said coil is connected by wire 55 with the other side of the line X. Terminal 38 is connected by wire 56 with terminal L.

Aquastat T will be set so as to break the circuit at 37—38 when the water in tank 1 reaches the desired high maximum, say 205 degrees F. (or a temperature even above water boiling in case a pressure device is connected to the return pipe 7) and to make contact at 37—38 whenever the water temperature in tank 1 drops to the desired high minimum, say 200 F. Aquastat T' will be set to break contact at 39—40 when the water in tank 1 reaches a desired low maximum, say 140 degrees F., and to make contact at 39—40 when the desired low minimum, say 100 degrees F., is reached.

The operation is as follows: Assuming timetrain 21 to have shifted valve 19 to establish gas flow through the low rate meter 13, tube 45 will be tilted so as to connect terminals L, L', whereupon aquastat T will be in command and terminals 37—38 will be connected if the temperature of the water in tank 1 is below the desired high maximum, thus establishing the circuit; line, 55, coil 12', 54, 37, 38, 56, L, L', 52, 53, line; thus opening the gas valve and permitting the gas heater to function until the temperature in tank 1 has been brought to the desired high maximum. Aquastat T will remain in command, automatically causing opening and closing of the gas valve in accordance with the temperature of the water in tank 1, until the time-train shifts valve 19 to dis-establish gas flow through the low rate meter 13 and to establish gas flow through the high-rate meter 14. When the train shifts the valve 19 to cause gas flow through the high rate meter 14, the aquastat T' will be in command and it will maintain disconnection between terminals 39—40 until the temperature of the water in tank 1 has dropped to the desired minimum, so that the gas valve 12 will remain closed until the heat which has been stored in the water in tank 1 has been exhausted to the desired minimum. If this exhaustion takes place before the time-train has advanced sufficiently to again shift valve 19, to the low-rate position, the shifting of the aquastat T' to cause connection between terminals 39 and 40 will cause an opening of the gas valve through the circuit; line, 55, coil 12', 54, 39, 40, 51, H, H', 52, 53, line; and there will be a flow of gas through the high rate meter until the water tank 1 has been brought to the desired low maximum.

It will be seen therefore that fuel consumption during the low rate period will be utilized to store up heat in the water of the system for extraction during a major portion, or perhaps all, of the high rate period and the gas consumption during the high rate period will be reduced to a minimum.

At all times the room thermostat 30 will cause automatic manipulation of the valve 31 to determine water flow from tank 1 through radiator 5 in accordance with the room temperatures.

It will be readily understood that my invention is applicable to a hot water heating system wherein the heat is supplied by electric current, by merely substituting an electrical heating element for the gas heater 8, an adequate switch for the gas valve 12, and a three-point switch for the three-way valve 15, electric meters of course being substituted for the low-rate and high-rate gas meters indicated in the diagram.

While, in the present embodiment, the power line has been shown as a gas pipe 16, it will be obvious that, in an electrical system, such power line would be line wires.

Wherever the term "power line" is used in the appended claims, it is to be understood that the same applies not only to a gas pipe, but also to an electrical conductor or other conductor of energy. It will of course be understood that a heat-transferring circulating medium other than water may be used and the term "hot water" is intended to include such other medium.

I claim the following:

1. The method of heating a building which consists in storing heat by bringing a fluid mass to a predetermined temperature during periods of low-priced heat supply, and releasing such heat during periods of high-priced heat supply, while maintaining the temperature of such fluid above a predetermined minimum lower than said first-mentioned predetermined temperature.

2. The method of heating a building which consists in heating a body of fluid to a predetermined temperature during periods of low-priced heat supply, storing such fluid in a heat-insulated container, and permitting radiation from such fluid in the building during periods of high-priced heat supply, while automatically supplying heat to such fluid, as needed during said last-mentioned periods, to maintain the temperature of said fluid above a predetermined minimum which is lower than said first-mentioned temperature.

3. The method of heating a space during periods of high and low-priced heat supply which consists in maintaining a body of fluid at temperatures between predetermined limits by application of heat during periods of high-priced heat supply, super-heating such body of fluid to temperatures between a different minimum and a higher maximum during periods of low-priced heat supply, and drawing heat from said fluid body, at rates independent of the price of heat supply, during all of such periods.

4. The method of heating a space during periods of high-priced and low-priced heat supply which consists in maintaining a body of fluid at temperatures between a predetermined minimum and a predetermined maximum by application of heat during periods of high-priced heat supply, super-heating such body of fluid to temperatures between a second minimum, which is higher than said first-mentioned maximum, and a second maximum during periods of low-priced heat supply, and drawing heat during all such periods from such body to heat said space.

5. The method of heating a space by means of energy derived from a source subject to variable load conditions, which comprises the steps of selectively connecting said energy source through a low-cost-rate meter or through a high-cost-rate meter to heat a body of fluid, automatically maintaining a relatively high fluid temperature during periods when said source is connected through said low-cost-rate meter, and a relatively low fluid temperature during periods when said source is connected through said high-cost-rate meter, and drawing heat from said fluid body to heat said space.

6. The method of economically maintaining heat radiating capacity in a body of fluid, which comprises the steps of supplying, from an energy source subject to variable load conditions, energy to heat said fluid body, and automatically controlling the energy supply to maintain the heat radiating capacity of said body above a predetermined low-maximum value during periods of off-peak load upon said energy source, and below said low-maximum but above a predetermined low-maximum value during periods of peak load upon said energy source.

7. The method of economically utilizing energy produced at a substantially constant rate and normally dispensed at a variable rate, which consists in utilizing such energy, during periods of low demand upon said source, to raise the temperature of a body of fluid to a predetermined value, utilizing such energy, during periods of high demand upon said source, to maintain the temperature of said fluid body above a second predetermined, but lower value, and drawing upon the heat so stored in said fluid body to perform useful work.

PAUL F. SHIVERS.